United States Patent [19]

Fowler et al.

[11] 4,267,682
[45] May 19, 1981

[54] BUILDING PANEL

[76] Inventors: Neal G. Fowler, 872 Albany Ave., Ventura, Calif. 93003; Charles L. Hedrick, 205 W. Rosa, Oxnard, Calif. 93030

[21] Appl. No.: 36,437

[22] Filed: May 7, 1979

[51] Int. Cl.³ .......................... E04B 1/56; E04C 2/38
[52] U.S. Cl. ................................. 52/657; 403/174; 403/231; 403/403; 52/280
[58] Field of Search ............... 52/656, 657, 291, 280; 160/374, 379, 377, 378; 403/174, 178, 231, 401–403

[56] References Cited

U.S. PATENT DOCUMENTS

| | | | |
|---|---|---|---|
| 368,506 | 8/1887 | Berrien | 160/379 |
| 411,945 | 10/1889 | Weber | 52/291 |
| 651,251 | 6/1900 | Karr | 52/291 |
| 1,561,470 | 11/1925 | Kihm | 52/657 |
| 1,571,661 | 2/1926 | Descoteau | 160/374 |

FOREIGN PATENT DOCUMENTS

| | | | |
|---|---|---|---|
| 1130512 | 10/1956 | France | 403/174 |
| 1145852 | 3/1969 | United Kingdom | 403/231 |

Primary Examiner—James L. Ridgill, Jr.
Attorney, Agent, or Firm—Jack C. Munro

[57] ABSTRACT

The building is to be constructed of a plurality of interconnected building panels. Each said building panel is to be of a square or rectangular or other convenient polygonal shape and is to include a plurality of corner members with each corner member including a pair of openings, the longitudinal center axes of which intersect. The corner members include a web section which is to be connectable with a brace assembly. An end of an elongated tubular member is to be telescopingly located within each opening of a corner member with the arrangement of the elongated tubular members forming an enclosed area. There is to be a pair of separate brace assemblies located in a crossed arrangement across the enclosed area. Each brace assembly is composed of a pair of members which are interconnected together by a turnbuckle for the purpose of adjustment. Each corner member is constructed of two identical members assembled in a mirror image relationship and welded together.

5 Claims, 9 Drawing Figures

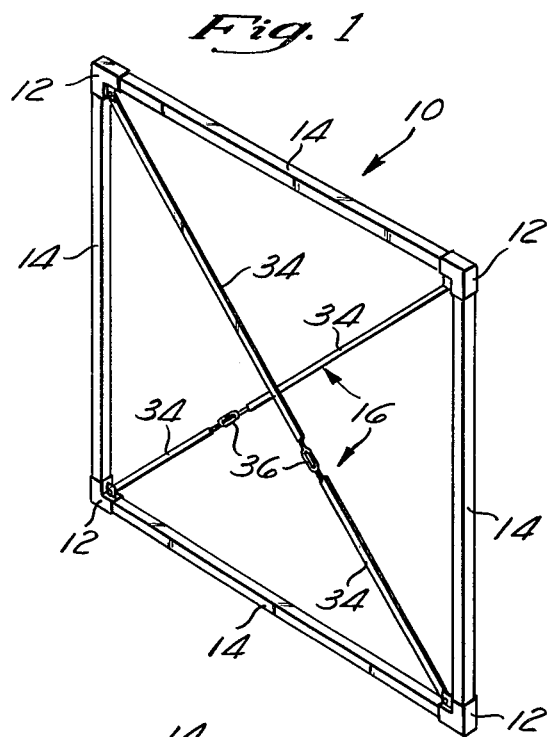
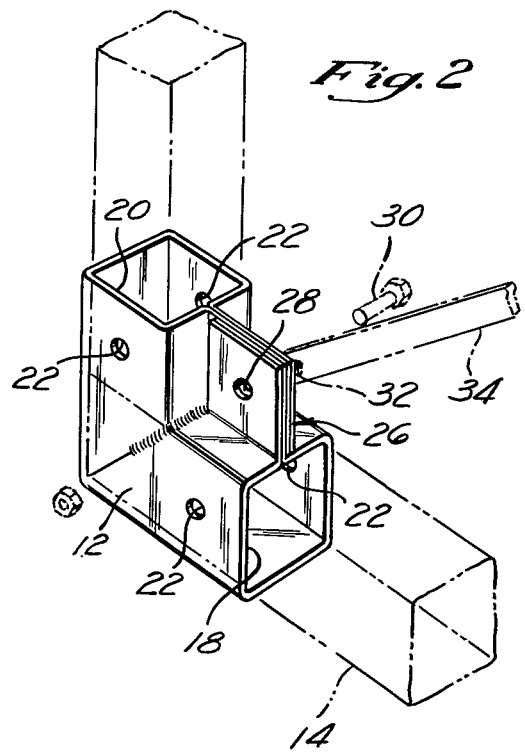
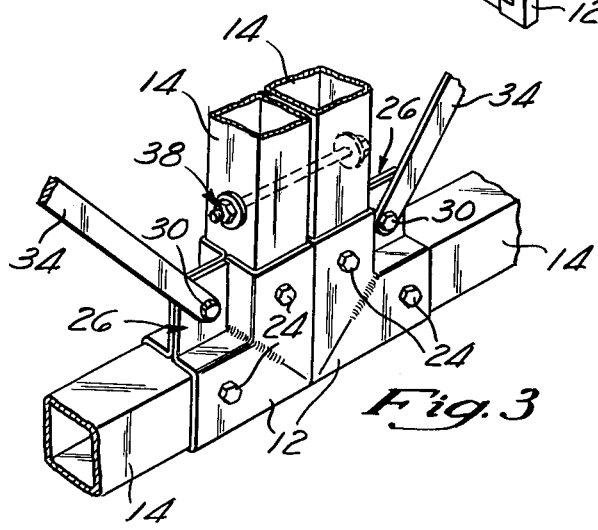
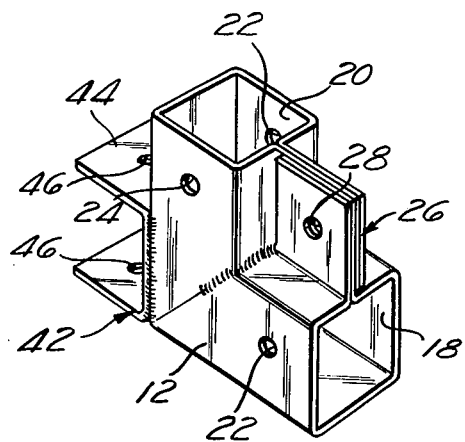
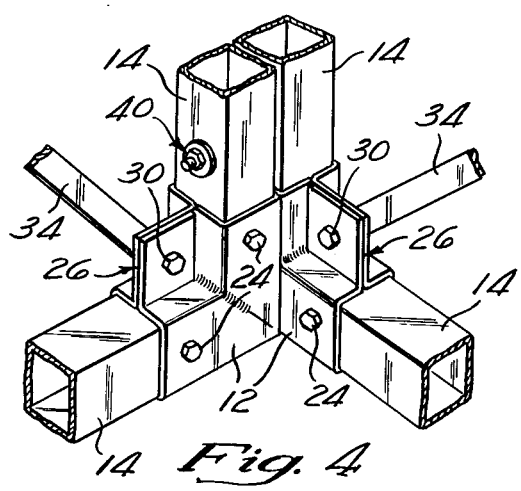

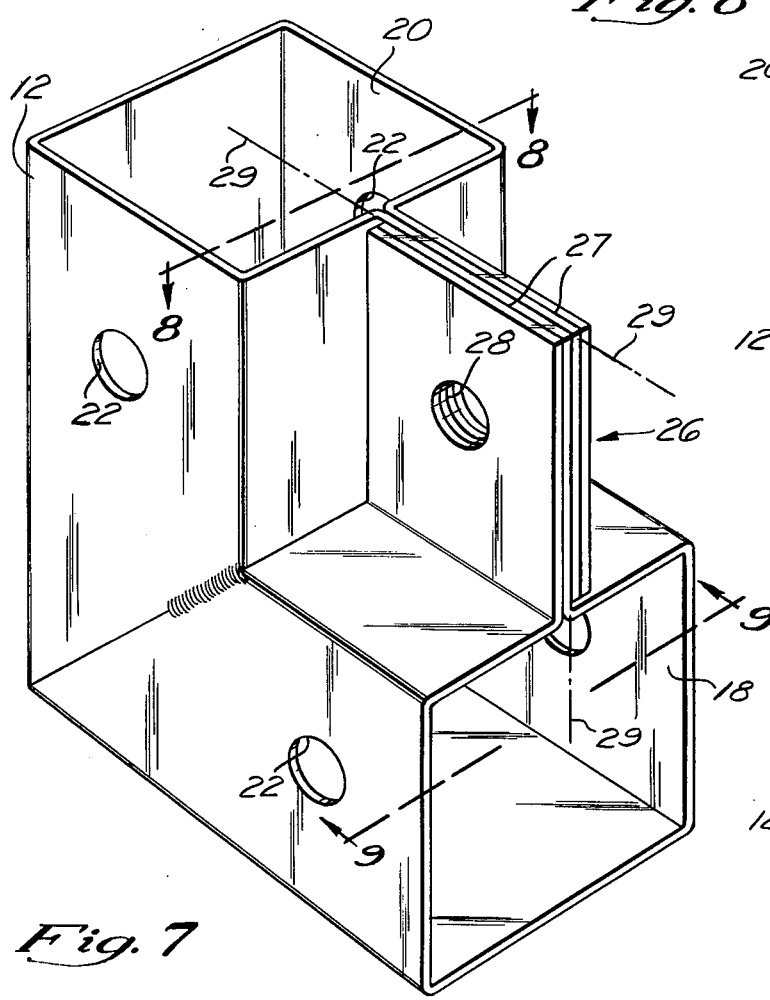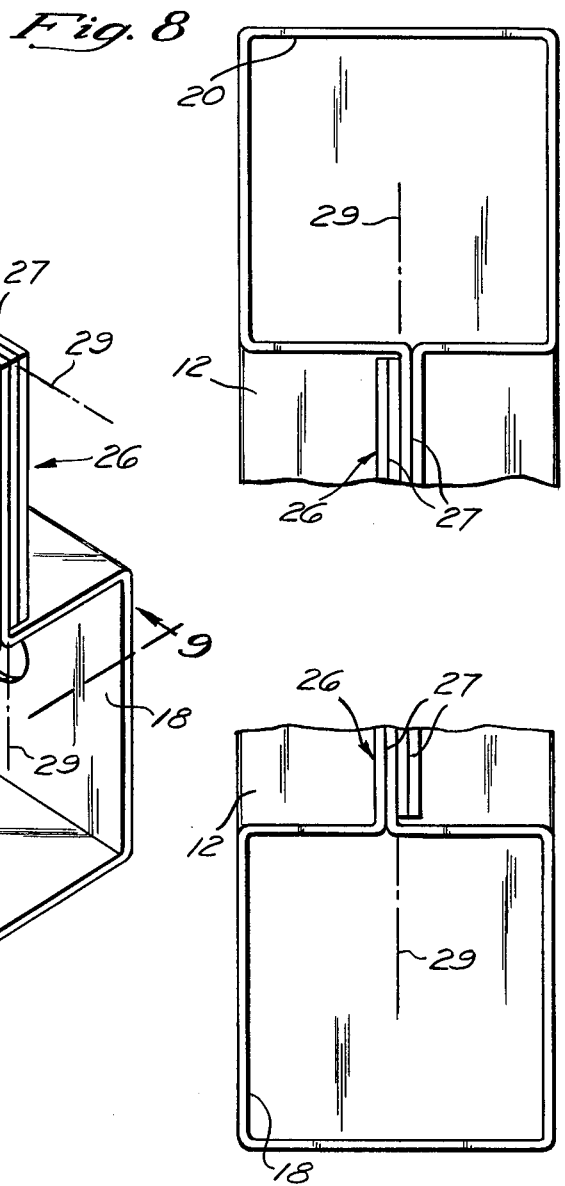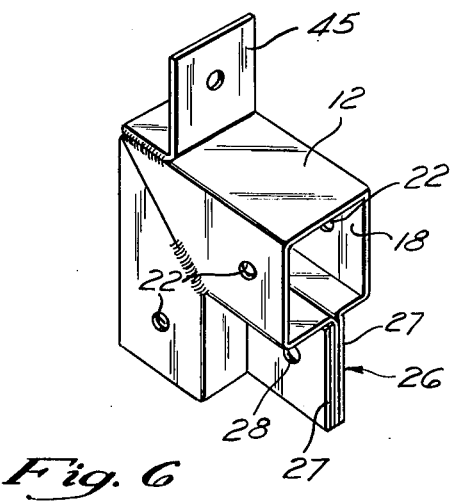

BUILDING PANEL

BACKGROUND OF THE INVENTION

The field of this invention relates to the construction of buildings.

There is a continual need to construct buildings simple and as strong as possible and also as inexpensively as possible. Although most buildings are constructed of combinations of wood, metal and cement, it has been known for some time to construct buildings solely out of metal.

Metallic buildings have a certain advantage in that they are normally movable. The metallic building is constructed of assembled parts and can be disassembled and moved to another location. This type of building construction is of particular advantage within airports where the buildings can be used as a airplane hanger. Also, such buildings are of particular advantage as storage buildings.

The building must be assembled in a manner to be strong enough to resist natural forces such as the weight of snow and force of wind. Previous to this invention, to construct a building of sufficient strength required metallic buildings to be constructed of a substantial number of parts which made such a building quite expensive. Also, the assembling and disassembling procedure for the building was quite complex.

SUMMARY OF THE INVENTION

The building of this invention is to be composed of a plurality of interconnected panels. Each of the panels is constructed in the same manner and is constucted of the same parts. The panels are to be interlocked together with a roof being attached at the upper edge of each of the panels. The lower edge of the panels forming the building are to be locked or otherwise secured to the supportive surface. Examples of supportive surfaces are cement, asphalt or even dirt.

The exterior surface of each of the panels are to have attached thereto a steel sheeting which is usally corrugated. Access means will be provided into the building through one or more doors. Each of the panels is to be of a square or rectangular configuration which then has four corners. A corner member is to be located at each corner with each corner member having a pair of polygonal shaped openings. The longitudinal center axis of each of the openings of each corner member are to intersect in a perpendicular manner. Each corner member is composed of a pair of identical elements which are assembled together and welded. An end of an elongated tubular member is to be telescopingly located, in a close fitting manner, within each opening of each corner member. Each elongated tubular member is to connect with a pair of corner members. Each corner member also includes a web section which is formed to facilitate attachment to a brace assembly. There are to be two separate brace assemblies which are to be located in a crossed manner across the enclosed area of the panel. Each brace assembly is to interconnect with a pair of corner members. Each brace assembly is formed of two separate brace members which are interconnected together through a turnbuckle. The turnbuckle is for the purpose of tightening the brace assembly thereby forming a solid panel structure.

BRIEF DESCRIPTION OF THE DRAWING

FIG. 1 is an isometric view of the building panel of this invention;

FIG. 2 is an enlarged isometric view of a corner member within the building panel of FIG. 1 showing in phantom lines the interconnection of the corner member to the elongated tubular members and the brace assembly;

FIG. 3 is an isometric view of a corner section of an aligned pair of building panels of this invention showing the connection between the pair of panels;

FIG. 4 is a view similar to FIG. 3 but with the building panels located perpendicular to each other;

FIG. 5 is an isometric view of a first modified form of corner member;

FIG. 6 is an isometric view of a second modified form of corner member;

FIG. 7 is an enlarged isometric view showing the basic construction of the corner members;

FIG. 8 is a view taken along line 8—8 of FIG. 7; and

FIG. 9 is a view taken along line 9—9 of FIG. 7.

DETAILED DESCRIPTION OF THE SHOWN EMBODIMENT

Referring particularly to the drawing, there is shown in FIG. 1 the building panel 10 of this invention which takes the form of a plurality (four in number) of corner members 12, a plurality (four in number) of elongated tubular members 14 and a plurality (two in number) of brace assemblies 16. It is to be understood that the corner members 12 are to be formed of a sheet metal usually steel. Similarly, the tubular members 14 are constructed of steel sheet material. The brace assembly 16 will be constructed of flat sheet strips.

Each corner member 12 includes a first opening 18 and a second opening 20. It is to be noted that the cross-sectional configuration of each of the openings 18 and 20 is to be polygonal shaped and preferrably square. Also, each of the openings 18 and 20 are the same size and of the same length. Additionally, the longitudinal center axis of each of the openings 18 and 20 intersect at a right angle.

An end of an elongated tubular member is to slide into each of the openings 18 and 20. Each elongated tubular member 14 is to connect with a pair of corner members 12. The elongated tubular member 14 is to closely conform to the interior of its respective opening 18 or 20. This close conforming prevents rotational movement between the corner members 12 and the tubular members 14. Because the size of the openings 18 and 20 are identical, there is only one cross-sectional size used of the tubular members 14. It is to be understood that the length of the tubular members 14 could be any desirable length such as six feet, eight feet, ten feet or twelve feet.

It may be desirable to include some type of rivet or fastener such as a bolt to securely lock into position the tubular members 14 with respect to the corner members 12. For this purpose, holes 22 are located within each of the corner members 14 which are to connect with a fastener 24 which in turn are to connect with an appropriate opening (not shown) formed within the tubular member 14. It is to be understood that the use of the fastener 24 is not required.

Each corner member 14 has integrally formed thereon a web section 26. The web section 26 includes a hole 28. The actual structure of the web section will be explained further in this specification. A bolt fastener 30 is to be conducted through the hole 28 and hole 32 of a brace member 34. The longitudinal interconnection of a pair of braces 32 forms a brace assembly 16. The brace members 34 of a brace assembly 16 are interconnected together by means of a turnbuckle assembly 36. By tightening of the turnbuckle 36, the length of the combined brace members 34 is shortened. Therefore, with the brace assembly 16 located in the crossed pattern shown within FIG. 1 of the drawing, it can be seen by adjusting of the turnbuckles 36, the resulting formed panel 10 will be constructed tightly secure.

Referring particularly to FIG. 3 of the drawing, it can be seen that adjacent aligned panels 10 are to be secured together through a bolt assembly 38 which is passed through appropriate openings formed between abutting elongated tubular members 14. It is to be understood that there would normally be more than a single bolt assembly 38 employed between the abutting tubular members 14. It is also to be noted that there is actually no attachment directly between corner members 12. The normal procedure for securing the panels 10 to the surface upon which it is supported is through fastening bolts (not shown) which are conducted through the elongated tubular members 14 which are located on the supportive surface.

The panels 10 can be arranged perpendicular to each other as shown within FIG. 4 of the drawing. In the particular instance the bolt assembly 40 is employed to secure together abutting elongated tubular members 14 of the different panels 10.

It is to be expected that different types of corner members 12 will be required. In one particular installation, a specific type of corner member may be required if it is located at a certain location upon the supportive surface. Another type of corner member would be required at the adjoining of the roof. The basic shape of the corner member 12 is always maintained but the corner member 12 can be modified to accommodate specific attachment requirements.

Referring particularly to FIG. 5, there is shown a corner member 42 which is slightly different than corner member 12 in that it includes an attaching bracket 44. The bracket is U-shaped and includes a pair of aligned bolt receiving openings 46 and 47. The remaining parts of the corner member 42 are identical to the corner member 12 with like numerals having been employed to refer to like parts. The corner member 42 will normally be employed at the roof section and tied to connecting cross members (not shown). The bracket 44 is to be secured by welding to the back side of corner member 12. A different shaped attaching bracket 45 is depicted in FIG. 6.

Referring particularly to FIGS. 7-9, there is shown the corner member 12 in enlarged detail. Like numerals have been employed to refer to like parts. Each corner member 12 is constructed of two separate identical parts which are to be connected together in a facing, abutting relationship. Actually, assuming both identical parts are side-by-side and facing in the same direction, one part is pivoted one hundred and eighty degrees in a horizontal plane and then that same part is then pivoted ninety degrees in a vertical plane (the top of that part moving away from the other part). It is to be noted that the web element 27 of each part is offset so that the inside member aligns with center line 29 shown in FIGS. 8 and 9. Therefore, when the inside surfaces of elements 27 are placed side-by-side and abutting, a centrally located web 26 is formed.

The resulting building which is constructed by the assembled panels 10 of this invention will comply with most building code requirements. It is to be understood that once the building is constructed by the panels 10 and a roof section has been placed thereon that the exterior surface of the panels 10 will be covered as with corrugated sheet metal. Sheet metal is to be attached to the exterior surface of the elongated tubular members 14.

What is claimed is:

1. A panel to be interconnected with several other similar panels to construct a building, said panel being polygonal shaped, said panel comprising:

a plurality of corner members, each said corner member having a pair of openings, the longitudinal center axis of each of said openings intersecting, each said opening having a center line, each said corner member being constructed of two separate identical parts connected together by a diagonal weld in a facing and abutting relationship;

a plurality of elongated tubular members, one end of a said tubular member to be telescopingly located within one of said openings of a said corner member with the opposite end of the said tubular member to be telescopingly located within a said opening of another said corner member, each said opening of each said corner member being occupied by a said tubular member with said tubular members being arranged to form an enclosed area;

brace means located between a pair of said corner members and attached thereto, said brace means comprising a pair of brace members interconnected by connecting means, said connecting means being operable to vary the longitudinal length of said brace means, said brace means located substantially along a single axis, said single axis being inclined in respect to the longitudinal center axis of each said elongated tubular member; and each said corner member including a sheet material web section, each said web section including attachment means to facilitate securement with said brace means, said brace means being fixedly secured to said web section, each said web section having an inside surface, said inside surface lying in a plane which passes through said center point whereby said web section is offset in respect to said center point.

2. The panel as defined in claim 1 wherein:
each of said openings of each said corner member being polygonal shaped in cross-section, each of said elongated tubular members in cross-section being of a similar said polygonal shape.

3. The panel as defined in claim 2 wherein:
each said corner member including a web section, each said web section including attachment means to facilitate securement with said brace means.

4. The panel as defined in claim 3, wherein:
there being a plurality of said brace means for each said panel, each of said brace means being located in a crossed arrangement.

5. The panel as defined in claim 4 wherein:
said connecting means comprising a turnbuckle assembly.

* * * * *